（12）United States Patent
Whynot et al.

(10) Patent No.: US 8,554,828 B2
(45) Date of Patent: *Oct. 8, 2013

(54) DISTRIBUTED CALL SERVER SUPPORTING COMMUNICATION SESSIONS IN A COMMUNICATION SYSTEM AND METHOD

(75) Inventors: Stephen R. Whynot, Richardson, TX (US); Paul D. DeFrain, Plano, TX (US)

(73) Assignee: Rockstar Consortium US LP, Plano, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/824,034

(22) Filed: Jun. 25, 2010

(65) Prior Publication Data

US 2010/0262700 A1 Oct. 14, 2010

Related U.S. Application Data

(63) Continuation of application No. 10/610,511, filed on Jun. 30, 2003, now Pat. No. 7,765,302.

(51) Int. Cl.
*G06F 15/16* (2006.01)

(52) U.S. Cl.
USPC .......... 709/201; 709/204; 709/205; 709/227; 709/228

(58) Field of Classification Search
USPC .......... 709/201, 204, 205, 227, 228; 370/325, 370/260, 261, 270, 354; 379/202.01, 379/211.02

See application file for complete search history.

(56) References Cited

U.S. PATENT DOCUMENTS

| | | | |
|---|---|---|---|
| 5,619,555 A | 4/1997 | Fenton et al. | |
| 5,710,591 A | 1/1998 | Bruno et al. | |
| 5,812,653 A | 9/1998 | Jodoin et al. | |
| 5,889,945 A | 3/1999 | Porter et al. | |
| 6,125,115 A | 9/2000 | Smits | |
| 6,185,565 B1 | 2/2001 | Meubus et al. | |
| 6,201,562 B1 | 3/2001 | Lor | |
| 6,259,469 B1 | 7/2001 | Ejima et al. | |
| 6,594,693 B1 | 7/2003 | Borwankar | |
| 6,854,114 B1 | 2/2005 | Sexton et al. | |
| 6,920,475 B1 | 7/2005 | Klots et al. | |
| 6,976,055 B1 | 12/2005 | Shaffer et al. | |
| 7,003,086 B1 | 2/2006 | Shaffer et al. | |
| 7,042,879 B2 | 5/2006 | Eschbach et al. | |
| 7,177,302 B2 | 2/2007 | Stademann | |
| 2002/0161578 A1 | 10/2002 | Saindon et al. | |
| 2003/0156135 A1 | 8/2003 | Lucarelli | |
| 2003/0232245 A1 | 12/2003 | Turak et al. | |
| 2003/0236906 A1 | 12/2003 | Klemets et al. | |
| 2004/0236574 A1 | 11/2004 | Ativanichayaphong et al. | |
| 2005/0095569 A1 | 5/2005 | Franklin | |
| 2005/0187781 A1 | 8/2005 | Christensen | |
| 2005/0203677 A1 | 9/2005 | Auger et al. | |
| 2005/0204309 A1 | 9/2005 | Szeto | |

FOREIGN PATENT DOCUMENTS

WO WO 03/051027 A1 6/2003

OTHER PUBLICATIONS

Office Action dated Nov. 14, 2008 as issued in U.S. Appl. No. 10/610,508.
Office Action dated Mar. 4, 2009 issued in connection with U.S. Appl. No. 10/813,770.
Office Action dated May 27, 2009 issued in connection with U.S. Appl. No. 10/674,860.
Kumar et al., "IP Telephony with H.323, Architectures for Unified Networks and Integrated Services", Apr. 1, 2001, pp. 134-142, pp. 290-298.

*Primary Examiner* — Djenane Bayard

(57) ABSTRACT

An apparatus, method, and computer program manage communication sessions that include a plurality of portions. Different processors handle each portion of a communication session. The apparatus, method, and computer program transfer the communication session from one of the processors to another of the processors during the different portions of the communication session.

15 Claims, 7 Drawing Sheets

US 8,554,828 B2

DISTRIBUTED CALL SERVER SUPPORTING COMMUNICATION SESSIONS IN A COMMUNICATION SYSTEM AND METHOD

CROSS REFERENCE TO RELATED APPLICATIONS

This application is a continuation of prior U.S. patent application Ser. No. 10/610,511 filed on Jun. 30, 2003, now U.S. Pat. No. 7,765,302 which is related to U.S. patent application Ser. No. 10/610,373 entitled "APPARATUS, METHOD, AND COMPUTER PROGRAM FOR MANAGING RESOURCES IN A COMMUNICATION SYSTEM" filed on Jun. 30, 2003, and U.S. patent application Ser. No. 10/610,508 entitled "APPARATUS, METHOD, AND COMPUTER PROGRAM FOR PROCESSING AUDIO INFORMATION IN A COMMUNICATION SYSTEM" filed on Jun. 30, 2003, which are incorporated herein by reference.

TECHNICAL FIELD

This disclosure relates generally to communication systems and more specifically to a distributed call server supporting communication sessions in a communication system and method.

BACKGROUND

Conventional communication systems often include one or more call servers, which are used to establish and support communication sessions in the systems. For example, a typical call server could receive requests to initiate telephone calls or conference calls. The server then establishes one or more connections or channels used to transport audio or video information during the calls. A problem with conventional call servers is that they typically handle different types of calls similarly. This often makes it difficult to handle each type of call in a more efficient manner.

SUMMARY

This disclosure provides a distributed call server supporting communication sessions in a communication system and method.

In one aspect, an apparatus for supporting a communication session includes a plurality of processors. Each processor is operable to perform at least one function in support of a communication session portion of a communication session. The apparatus also includes a controller operable to transfer the communication session from one of the processors associated with a first portion of the communication session to another of the processors associated with a second portion of the communication session. The controller associates a distinct network address with each of the communication session portions.

In another aspect, a method for supporting a communication session includes establishing a communication session using one of a plurality of processors. The communication session includes a plurality of portions, and the processors are operable to perform at least one function in support of different portions of the communication session. The method also includes detecting a transition from one of the portions of the communication session to another of the portions of the communication session. The method further includes transferring the communication session from one of the processors associated with one portion of the communication session to another of the processors associated with another portion of the communication session. A distinct network address is associated with each of the communication session portions.

In yet another aspect, an apparatus for supporting communication sessions includes a plurality of processors. Each processor is operable to perform at least one function in support of a communication session. The apparatus also includes a first controller operable to transfer the communication session from one of the processors to another of the processors during different portions of the communication session. The first controller is also operable to transmit first messages to a second controller and receive second messages from a third controller. The first and second messages associated with communication sessions handled by the controllers. The first messages include at least one of one or more messages generated by the first controller and one or more of the second messages.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
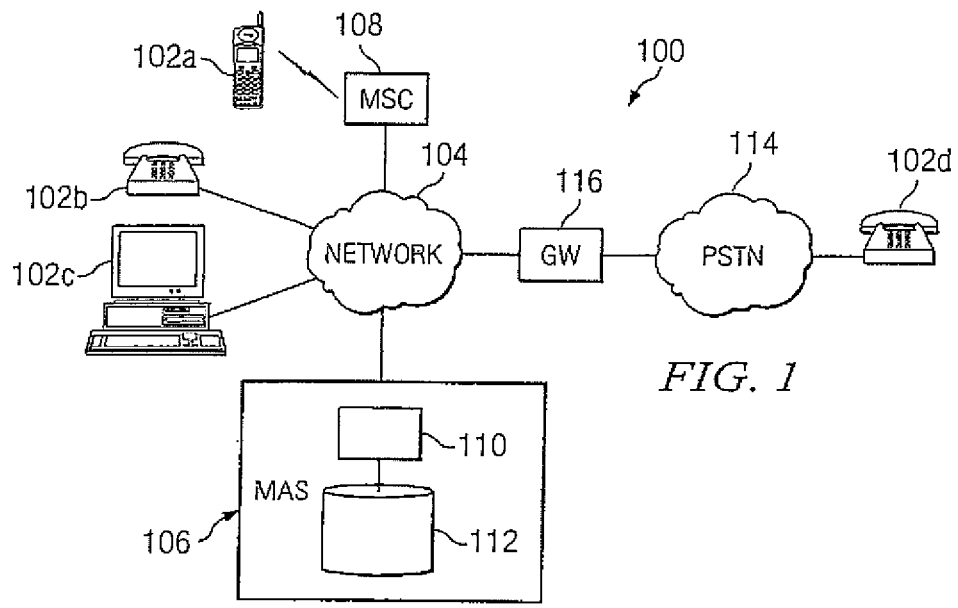
FIG. 1 illustrates an example communication system according to one embodiment of this disclosure.

FIG. 1 illustrates an example communication system 100 according to one embodiment of this disclosure. The system 100 shown in FIG. 1 is for illustration only. Other embodiments of the system 100 may be used without departing from the scope of this disclosure.

In the illustrated example, the system 100 includes one or more communication devices 102*a*-102*c*, a network 104, and a media application server ("MAS") 106.

The communication devices 102*a*-102*c* represent devices used by users or subscribers during communication sessions, or data conversions or conversations between devices or applications over a network. For example, each communication device 102 represents an input/output device that could include a microphone and a speaker to capture and play audio information. A communication device 102 could also include a camera and a display to capture and play video information.

During a communication session, the devices 102 communicate with the MAS 106 over the network 104. As an example, the communication devices 102 may transmit audio information to the MAS 106 and receive audio information from the MAS 106. As will be appreciated, each communication device 102 may be constructed or configured from any suitable hardware, software, firmware, or combination thereof for transmitting or receiving audio or video information.

The system 100 shown in FIG. 1 illustrates various embodiments of the communication devices 102. For example, the communication device 102a represents a wireless mobile station that communicates with the network 104 through a mobile switching center ("MSC") 108. The communication device 102b represents a wired Internet Protocol ("IP") telephone that communicates directly with the network 104. An example of a suitable device is an i2004 Internet Telephone, commercially available from Nortel Networks, of Brampton, Ontario, Canada. The communication device 102c represents a personal computer. This represents three embodiments of the communication devices 102, and other or additional communication devices 102 may be utilized in the system 100 of FIG. 1. By way of illustration in FIG. 1, each of the communication devices 102a-102c is different. It will be understood, however, that the communication devices 102 in the system 100 may include or represent the same or similar type of device or other combination of communication devices.

The network 104 is coupled to the communication devices 102, the MAS 106, and the mobile switching center 108. In this document, the term "couple" refers to any direct or indirect communication between two or more components, whether or not those components are in physical contact with each other.

The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

Figure 2:
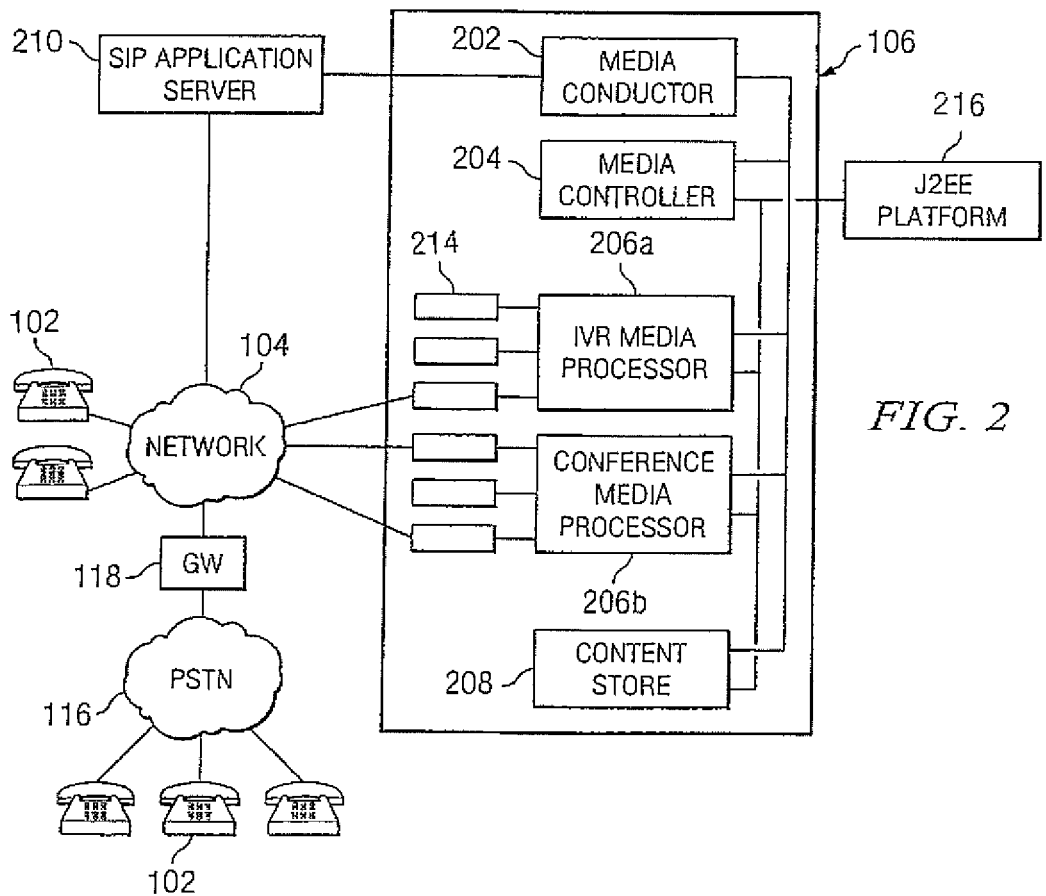
FIG. 2 illustrates an example Media Application Server according to one embodiment of this disclosure.

The media application server ("MAS") 106 is coupled to the network 104. The MAS 106 supports communication sessions between communication devices 102 in the system 100. For example, the MAS 106 may receive from one or multiple communication devices 102 requests to establish or join a conference call. The MAS 106 may also transmit/receive audio or video information to/from each communication device 102 and communicate information to the other communication devices 102 involved in the conference call. The MAS 106 may be constructed or configured using any hardware, software, firmware, or combination thereof for supporting communication sessions in the system 100. As an example, the MAS 106 could include one or more processors 110 that execute instructions and one or more memories 112 that store instructions and data used by the processors 110. An example MAS 106 is shown in FIG. 2, which is described below. The microprocessor(s) 110 is generally understood to be a device that drives a general-purpose computer. It is noted, however, that other processor devices, such as microcontrollers or ASICs, can be used as well and achieve the benefits and advantages described herein.

Communication session(s) established and managed by the MAS 106 can include additional communication devices other than the communication devices 102a-102c, For example, a communication device 102d is shown coupled to the network 104 through a public telephone network, such as a public switched telephone network ("PSTN") 114. The communication device 102d may include a conventional analog or digital telephone or some other type of communication device. In an embodiment where the PSTN 114 and the network 104 use different or incompatible protocols to communicate, a gateway 116 may be used that is coupled to the network 104 and the PSTN 114 to facilitate communication between the networks. The gateway 116 functions to translate between the different protocols used by the network 104 and the PSTN 114. Although one PSTN 114 is shown in FIG. 1 coupled to the network 104, other or additional types of public or private networks may be coupled to the network 104.

The communication devices 102 and the MAS 106 could support suitable standards or protocols used to set up, maintain, and terminate communication sessions between end users. As examples, the communication devices 102 and the MAS 106 could communicate audio, video, or other information in the Realtime Transfer Protocol ("RTP") over User Datagram Protocol ("UDP") and the International Telecommunication Union—Telecommunications ("ITU-T") H.263 standard (video CODECs) and other standards or protocols such as the G.711 and G.729 audio CODEC standards. Other CODECs, such as Moving Picture Experts Group-4 ("MPEG-4"), Digital Video Express ("DIVX"), and Windows Media Video ("WMV"), can be supported by the MAS 106. In addition, signaling messages sent between the communication devices 102 and the MAS 106 may include or conform with the Session Initiation Protocol ("SIP"), which is an application layer protocol for the establishment, modification, and termination of conferencing and telephony sessions over an IP-based networks. As will be appreciated, additional protocols and configurations may be used.

In one aspect of operation, the MAS 106 includes one or more processes, such as software applications providing an activity, a function, or a systematic sequence of operations that produces a specified result, for handling conference calls and one or more processes for handling non-conference calls. In this document, the phrase "conference call" refers to a communication session involving more than two participants, and the phrase "non-conference call" refers to a communication session involving two participants. By providing different processes to handle different types of calls, each type of call can be handled in a more efficient manner.

Moreover, a communication session may include different portions, where each portion is associated with a function performed by a different process. The MAS 106 includes logic operable to detect the different portions and to transfer a communication session to the appropriate process. As a particular example, a communication session could include one portion where the session is a conference call and another portion where the session is a non-conference call. The MAS 106, through program logic, detects when a non-conference call becomes a conference call and when a conference call becomes a non-conference call. Upon detection of a change, the MAS 106 takes suitable action, such as transferring the calls to the appropriate processes, as when one party in a two-way (non-conference) telephone call invokes a three-way calling feature (to become a conference call). Similarly, a conference call can become a non-conference call, such as when everyone except two participants exits a conference call.

In another aspect of operation, the MAS 106 monitors and manages the resources available to handle communication sessions. Upon request for a communication session, the MAS 106 determines the resources available for the communication session. If sufficient resources are determined to be unavailable, the MAS 106 may reject the communication session. As part of this determination, the MAS 106 monitors its operating conditions, such as the apportionment and availability of memory, task order, management of information in and out of the CPU, and the like, and utilizes such factors in the determination. As an example, if a rapid series of short communication sessions are being established, this generally consumes a large amount of resources, even though the sessions are short. The MAS 106 can take this into account and reject subsequent communication sessions that could have been accepted under different circumstances.

In yet another aspect of operation, the MAS 106 is configured to increase audio information processing efficiency. For example, the MAS 106 can pre-process audio information, such as pre-recorded announcements and prompts, using different coder-decoders ("CODECs"), which convert voice signals from analog to digital signals sufficient for digital PBXs and digital transmission systems, that are then converted back to analog for the end user. There are varying types of CODECs, such as G.711 and G.729 CODECs. When the processed audio information is needed, the MAS 106 can retrieve the appropriate digitized audio information from storage and stream the information without needing to process the audio information into analog form, and then back to digitized form, before transmission. Additionally, the MAS 106 may monitor the CODEC format used by the participants in a communication session and to reduce or minimize the amount of processing needed for the audio information exchange. In this way, the MAS 106 reduces the processing load, which helps provide an increased communication session capacity.

Additional features of the Media Application Server 106 are described below. It should be noted that particular embodiments of the Media Application Server 106 need not include each and every feature described in this document. For example, one embodiment of the Media Application Server 106 may include multiple processes for handling conference and non-conference calls as described above but deploy other audio information processes. As a further example, the Media Application Server 106 could be devoted to implement the resource management functionality described above, but not the multiple processes for handling calls described above.

Although FIG. 1 illustrates one example of a communication system 100, various changes may be made to FIG. 1. For example, varying communication devices 102, networks 104, and servers 106 could be used in the system 100. Also, the functionality described above as being implemented on a MAS 106 could be implemented on any other computing device, such as a desktop computer or a laptop computer. In addition, FIG. 1 illustrates one operational environment in which the various features of the MAS 106 may be used. These features could be implemented in any other suitable operating environment.

FIG. 2 illustrates the Media Application Server 106 according to one embodiment of this disclosure. Other embodiments or configurations of the MAS 106 may be used without departing from the scope of this disclosure. Also, while FIG. 2 illustrates the MAS 106 operating in the system 100 of FIG. 1, the MAS 106 could operate in other suitable systems.

In the illustrated example, the MAS 106 includes a media conductor 202, a media controller 204, two media processors 206a-206b, and a content store 208. The media conductor 202 processes signaling messages received by the MAS 106. The signaling messages could represent any suitable signaling messages, such as requests to establish a communication session or to invoke features like call forwarding and three-way calling. The media conductor 202 processes the signaling messages and communicates the processed messages to the media controller 204.

In some embodiments, the communication devices 102 communicate the signaling messages directly (or via a gateway, which serves as an entrance/exit into a communications network) to the MAS 106. In other embodiments, the communication devices 102 communicate signaling messages indirectly to the MAS 106, such as when a Session Initiation Protocol ("SIP") application server 210 (that received a request from a device 102) sends the signaling messages to the media conductor 202 on behalf of the communication device 102. The communication devices 102 may communicate directly with the SIP application server 210 or indirectly through a gateway, such as gateway 118.

The media conductor 202 may also implement SIP call control, parameter encoding, and media event package functionality. Additional functionalities provided by the media conductor 202 include providing a static network presence from which services may be deployed, acting as a SIP service portal, enforcing partitioned service resource assignments, supporting centralized management and throttling of traffic for multiple services, monitoring the health of the media controllers 204, and supporting service discrimination by allowing one or multiple controllers 204 to identify their supported services during registration. In particular embodiments, one or multiple conductors 202 may be used in the MAS 106. The media conductors 202 in the MAS 106 may be scalable independent of the execution environment and the resources used in the MAS 106.

The media controller 204 manages the operation of the MAS 106 to provide services to the communication devices 102. For example, the media controller 204 may receive processed SIP requests from the media conductor 202, where the requests involve conference or non-conference calls. The media controller 204 may then select the media processor 206 to handle each of the calls, perform audio/video capability negotiations, enforce licenses controlling how the MAS 106 can be used, and control negotiations based on the licenses. The term "processor" as used with respect to the media processor 206, means a software application for specific media processing, such as IVR media or conference media, which is executed on the MAS 106 hardware platform via the operating system. The negotiations may include identifying the CODEC to be used to encode and decode audio or video information during a call.

In some embodiments, the media controller 204 executes scripts, a form of program with a set of instructions to an application or utility program, and includes interpreters that process, for example, Nortel FSM, TCL, VoiceXML, and SALT scripts. The media controller 204 further monitors the capabilities and resources used by the media processors 206, facilitates real-time domain based resource assignments, and supports the auto-discovery of the media processors 206. In addition, the media controller 204 monitors the media processors 206 for reliability and fail-over purposes and supports the use of overflow ports during high-traffic periods. In particular embodiments, multiple controllers 204 are used in the MAS 106, and each registers its services with the media conductor 202 so that the media conductor 202 can perform service discrimination.

The media processors 206a-206b handle the exchange of audio or video information between communication devices 102 involved in a conference or non-conference call. For example, a media processor 206 receives audio and video information from one communication device 102 involved in a call, processes the information as needed, and forwards the information to at least one other communication device 102 involved in the call. The audio and video information is received through one or more ports 214, which couple the media processors 206 to the network 104. The ports 214 may be constructed or configured from any suitable structure operable to facilitate communication between the MAS 106 and the network 104. In some embodiments, each media processor 206 is associated with a unique set of ports 214. Each port 214 may be associated with a unique network address in the system 100, where the network address identifies the MAS 106 and the port 214 being assigned to a communication device 102.

In particular embodiments, the media processors 206 provide an origination and termination point for Realtime Transfer Protocol ("RTP")/Realtime Transfer Control Protocol ("RTCP") audio and video streams. The media processors 206 also support any suitable CODEC or CODECs used to process audio and video information, including the G.711 (ulaw and alaw), G.726, G.723, G.729A, Linear Pulse Code Modulation ("LPCM") 16, and LPCM 8 CODECs. One or more of the media processors 206 further support the Internet Engineering Task Force ("IETF") Request For Comment ("RFC") 2833 standard for the transport of dual-tone multi-frequency ("DTMF") signals over RTP connections. In this embodiment, the MAS 106 need not decompress actual audio information received from the communication devices 102 to identify the DTMF signals since the DTMF signals are sent as out-of-band messages. In addition, the media processors 206 support real-time transcoding and two-phase caching (disk caching and memory caching). The media processors 206 stream information from the disk cache or memory cache, as well as supporting real-time video streaming for MPEG-4 and H.263 and with constant or variable frame rates.

The media processors 206 may support multiple network interfaces for signaling/management and streaming, which may help to ensure a particular quality of service for communications. The media processors 206 may also use a shared pool of speech recognition, text-to-speech ("TTS"), or other resources. In some embodiments, no bearer redirection is needed for the media processors 206 to utilize network resources. The media processors 206 may have generic play, record, and conferencing capabilities for fully synchronized audio and video information. Digit collection occurs using any suitable technique, including IETF RFC 2833, standard tones, and SIP signaling. Varying techniques may be used to retrieve pre-recorded or recorded files, such as voice mail or audio prompts. These mechanisms include the Hypertext Transfer Protocol ("HTTP"), the File Transfer Protocol ("FTP"), the Trivial File Transfer Protocol ("TFTP"), and the Simple Mail Transfer Protocol ("SMTP"). Direct streaming is supported using HTTP.

In the illustrated embodiment, each media processor 206 provides different functionality in the MAS 106. For example, the media processor 206a handles two-party communication sessions and provides interactive voice response ("IVR") functionality in the MAS 106. As particular examples, the media processor 206a supports a voice mail function that can record and play messages or an auto-attendant function that provides a menu and directs callers to particular destinations based on their selections. The media processor 206b provides conferencing functionality in the MAS 106, such as by facilitating the exchange of audio and video information between communication devices 102 involved in a conference call. In particular embodiments, the IVR media processor 206a translates requests to recite numbers, digits, dates, times, or monetary values in specific currencies by using the International Organization for Standardization ISO 3166 country codes and ISO 639 language codes, namespaces, and domains. Supported audio files may include "raw" extension identified files, Waveform Audio ("WAV") files, Audio Video Interleave ("AVI") files, or any other suitable file type or types.

The content store 208 provides access to content used by the various components of the system 100. For example, the content store 208 provides access to stored voice mail messages and access codes used to initiate or join conference calls. The content store 208 may provide access to any other or additional information. In some embodiments, the content store 208 includes an interface to query, ingest, and manage content, as well as a data retrieval mechanism to retrieve content using any suitable protocol. One or more content stores 208 may share a common disk array or storage area network ("SAN"). The content store 208 is configured to use internal disks, external disks, an external Redundant Array of Independent Disks ("RAID") or SAN, or other storage and retrieval device or devices.

In particular embodiments, the content store 208 is cataloged in a logical namespace, which in turn contains unique mailboxes. The content is grouped and queried based upon content store attributes or custom attributes. Uniform Resource Locators ("URLs") to access the content are queried in real-time, and contents are retrieved from the content store 208 in real-time when needed. Platform mailboxes may be used to distribute content. Also, in particular embodiments, multiple servers 106 are used in the system 100, and two of the servers 106 includes a content store 208. In these embodiments, one content store 208 acts as a backup for the other content store 208. In particular embodiments, both content stores 208 (including the backup) are active. A MAS 106 that is without a content store 208 can use the content store 208 of another MAS 106. In other embodiments, the content store 208 is replaced by a conventional database or other data storage facility.

A Java 2 Enterprise Edition ("J2EE") platform 216 is coupled to the MAS 106. The J2EE platform 216 allows the MAS 106 to retrieve information used to provide subscriber services over the system 100. For example, the J2EE platform 216 may provide audio announcements used by the IVR media processor 206a. The J2EE platform 216 represents one possible apparatus used to provide audio or other information to the MAS 106. Any other or additional device or apparatus may be used to provide the information to the MAS 106.

In particular embodiments, the various components of the MAS 106 represent software processes executed by the one or more processors 206 of the MAS 106. This allows, for example, the MAS 106 to be scaled by simply increasing or decreasing the number of software processes being executed. Also, the various processes communicate with each other using any suitable protocol, such as the Transmission Control Protocol ("TCP"). In addition, the various processes have any suitable priority in the MAS 106. As an example, in order of decreasing priority, the media processors 206 are designated with a real-time priority, the media controller 204 is designated with a high priority, and the media conductor 202 and content store 208 are designated with a regular priority.

Although FIG. 2 illustrates one example of a Media Application Server 106, various changes may be made to FIG. 2 while maintaining the advantages and functionality recited herein. For example, any number of conductors 202, controllers 204, media processors 206, and content stores 208 may be used in the MAS 106. Also, the functional divisions shown in FIG. 2 are for illustration only. Various components can be combined or omitted or additional components can be added according to particular functional designations or needs. In addition, while the components 202-208 have been described as being executed by a MAS 106, the components 202-208 may be executed by other hardware platforms, for example, such as a desktop computer.

Figure 3:
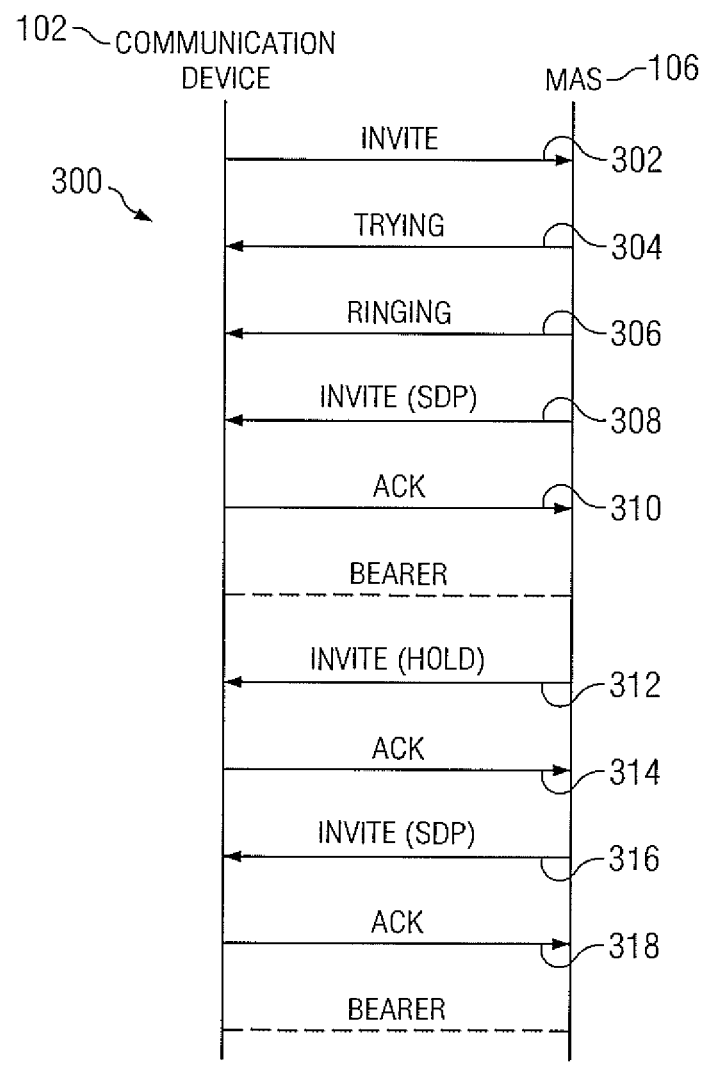
FIG. 3 illustrates example signaling messages used by the Media Application Server according to one embodiment of this disclosure.

FIG. 3 illustrates example signaling messages 300 deployed through the Media Application Server 106 according to one embodiment of this disclosure. The signaling messages 300 may, for example, represent messages supported by the SIP protocol. Other or additional types of signaling message handling may be implemented through the MAS 106 without departing from the scope of this disclosure. Also, the signaling messages 300 may be described as establishing and maintaining a telephone call. Other or additional messages may be used to establish and maintain other types of communication sessions.

Referring to FIG. 3, a communication device 102b initiates the establishment of a non-conference communication session by transmitting an invite message 302 to the MAS 106. The invite message 302 informs the MAS 106 that the communication device 102b seeks to establish a communication session.

The MAS 106 communicates a trying message 304 in response to the invite message 302 of the communication device 102b. The trying message 304 conveys information that the MAS 106 received the invite message 302 and is attempting to establish a connection to a called destination. If and when the MAS 106 contacts and begins ringing the called destination, the MAS 106 communicates a ringing message 306 back to the calling number, or in this instance the communication device 102b. The ringing message 306 conveys that the destination is being ringed. In some embodiments, this also causes the communication device 102b to generate a ring tone so that a user of the communication device 102b can hear that the destination is being ringed.

If a user answers the called destination, the MAS 106 communicates another invite message 308 to the communication device 102b. In the illustrated example, the invite message 308 represents a Session Description Protocol ("SDP") message, which conveys to the communication device 102b that the call has been answered at the destination. The invite message 308 also conveys to the communication device 102b information regarding the CODEC-type and port 214 allocated for the communication device 102b. The communication device 102b then sends an acknowledgement ("ACK") message 310 to the MAS 106, confirming that the invite message 308 was received at the communication device 102b. At this point, traffic is exchanged between the communication device 102b and the destination over a bearer channel.

At some point, this non-conference call session becomes a conference session. For example, either the communication device 102b or the called destination may invoke a three-way calling feature, which converts the two-way call into a three-way conference call. As described above, one media processor 206a handles non-conference calls, while a different media processor 206b handles conference calls. As a result, when a non-conference session becomes a conference session, the MAS 106 transfers the call from the first media processor 206a to the second media processor 206b.

To accomplish this, the MAS 106 communicates an invite message 312 to the communication device 102b. This invite message 312 places the communication device 102 on hold. The communication device 102b responds with an acknowledgement message 314, which informs the MAS 106 that the communication device 102b received the invite message 312. The MAS 106 then sends another invite message 316 to the communication device 102b. This invite message 316 informs the communication device 102b of a new port 214 assigned to be used by the communication device 102b. As an example, this transfers the non-conference communication session from a port 214 used by the media processor 206a to a port 214 administered by the second media processor 206b. The communication device 102b then transmits an acknowledgement message 318 to the MAS 106, which confirms that the communication device 102b has received the invite message 316 and can use the new port 214. At this point, the communication device 102b communicates audio and video information to the new port 214 of the MAS 106 over a bearer channel.

Although FIG. 3 illustrates one example of the signaling messages 300 used by the Media Application Server MAS 106, various changes may be made while maintaining the advantages and features as shown in FIG. 3. For example, other or additional communication protocols may be supported by the MAS 106 and the communication device 102b. Also, this description has described the transformation of a non-conference communication session into a conference session. The same or similar messages may be used to establish a conference communication session and transform the session into a non-conference session. In addition, any other or additional messages may be used to invoke supplemental features like call forwarding or to perform other functions before, during, or after a call.

Figure 4:
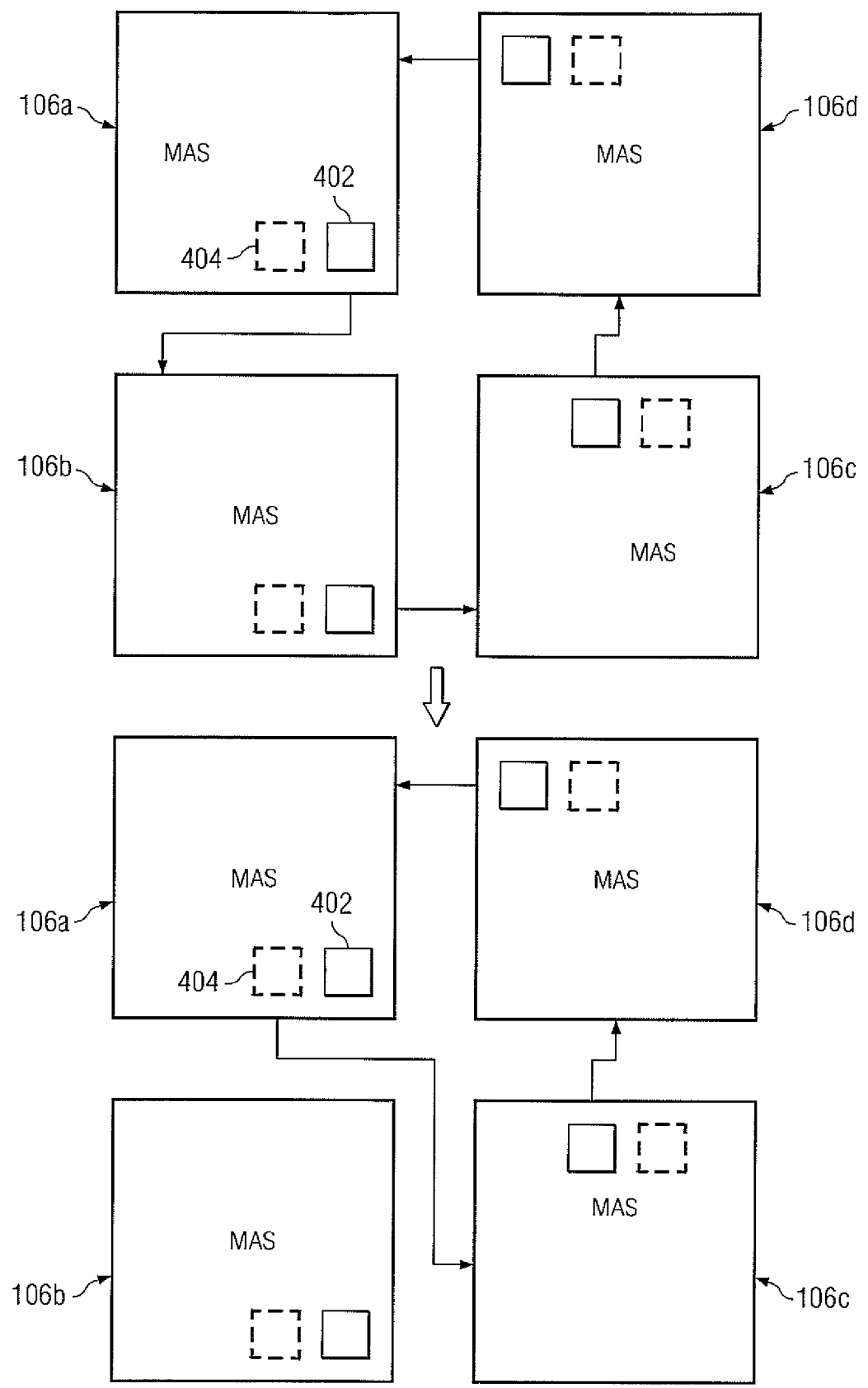
FIG. 4 illustrates an example arrangement of multiple Media Application Servers according to one embodiment of this disclosure.

FIG. 4 illustrates an example arrangement 400 of multiple Media Application Servers 106 according to one embodiment of this disclosure deploying a distributed architecture. In this example, multiple Media Application Servers 106a-106d are used in the system 100 of FIG. 1, and each of the Media Application Servers 106 communicate with one another to provide subscriber feature and services through the communication devices 102.

As shown in FIG. 4, the Media Application Servers 106 are configured in a ring arrangement. In this example, each MAS 106 receives information from only one other MAS 106 and transmits information to only one other MAS 106. In some embodiments, the media controller 204 in each MAS 106 generates and communicates messages for other Media Application Servers 106 over the ring. When a particular MAS 106 receives a message, the associated media controller 204 determines whether the message is meant for that MAS 106. If not, the message is forwarded to the next MAS 106 in the ring. A media controller 204 removes, or takes possession of, a message from the ring by not transmitting the message to the next MAS 106 in the ring. This may occur, for example, when the message is meant only for that MAS 106 or when the MAS 106 that originally sends a message receives the same message over the ring.

In this example, to facilitate communication between the Media Application Servers 106, each MAS 106 includes at least one primary forward address 402 and at least one backup forward address 404. For each MAS 106, the primary forward address 402 represents the network address of the next MAS 106 in the ring. Each MAS 106 transmits information to the next MAS 106 identified by the primary forward address 402 and receives information from the previous MAS 106 in the ring.

In the illustrated example, a MAS 106 may fail or otherwise be unable to communicate with another MAS 106 in the arrangement 400. For example, a MAS 106b could lose power or suffer an equipment failure. As another example, a communication link between two servers 106a and 106b may be severed or otherwise disrupted.

When this or other problems occur, one or more of the remaining servers 106 are reconfigured to route information around the out-of-service MAS 106. In each MAS 106, when communication with the MAS 106 identified by the primary forward address 402 fails, a backup forward address 404 is used to communicate with another MAS 106 in the ring. For example, the backup forward address 404 could identify the MAS 106 that lies ahead of the MAS 106 identified by the primary forward address 402. As a result, the ring is modified so that messages flow around, or circumvent, the out-of-service MAS 106b. If and when the out-of-service MAS 106b or communication link becomes operational or is re-established, the MAS 106b uses one or more of its addresses 402, 404 to reestablish communication and reinsert itself into the ring.

In this way, the servers 106 are easily configured and reconfigured to operate in the system 100. For example, each MAS 106 need not be configured to simultaneously communicate with all other servers 106. Also, newly introduced Media Application Servers 106 are more readily added to the arrangement 400. As an example, an additional MAS 106b may be added to the arrangement 400 by changing the primary forward address 402 in the previous MAS 106a.

The ability of the Media Application Servers 106 to communicate is useful in supporting various functions in the communication system 100. For example, the ability of the communication system 100 to support conference calls may depend on the ability of the Media Application Servers 106 to communicate. As a particular example, the participants who wish to join a conference call may use communication devices 102 that send requests to and that are initially served by different servers 106. Because different servers 106 are involved, a single conference media processor 206b is unable to establish a conference call between all participants. To support conference calls, the Media Application Servers 106 inform each other when participants to a conference call have requested service. The servers 106 then transfer some or all of the participants to a particular MAS 106, and the particular MAS 106 then establishes the conference call with all of the conference call participants.

Although FIG. 4 illustrates one example of an arrangement 400 of multiple media application servers 106a-106d, various changes may be made to FIG. 4. For example, other suitable arrangements could be used to facilitate communication between the servers 106. Also, each MAS 106 may transmit information to and receive information from any of the other Media Application Servers 106.

Figure 5:
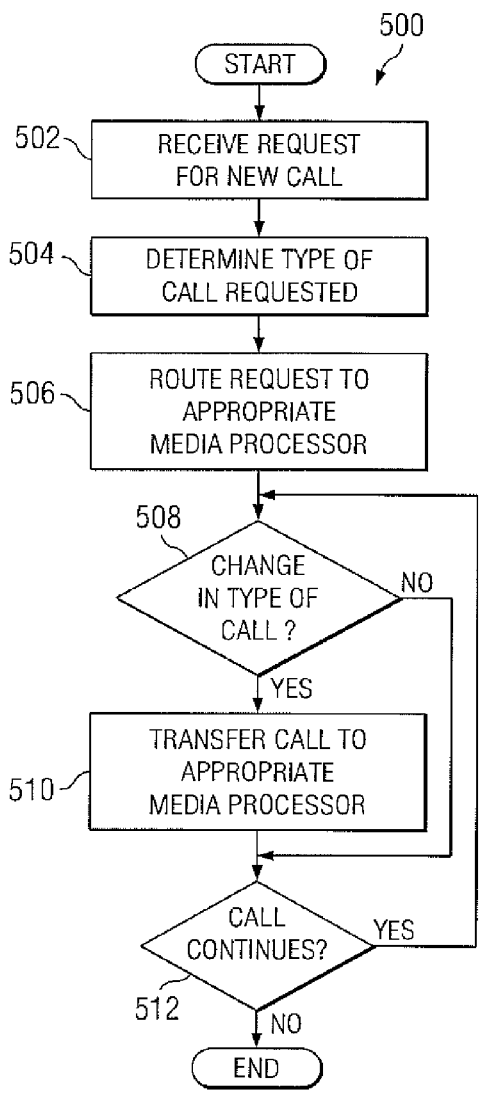
FIG. 5 illustrates an example method for providing communication services in a communication system according to one embodiment of this disclosure.

FIG. 5 illustrates an example method 500 for providing communication services in a communication system. For clarity, the method 500 may be described with respect to the MAS 106 of FIG. 2 operating in the system 100 of FIG. 1. The method 500 may also be used by other suitable devices or in any other suitable system.

A Media Application Server 106 receives a request for a requested communication session or other communication session at step 502. This may include, for example, a media conductor 202 receiving one or more SIP signaling messages indicating that a communication device 102 wishes to initiate a conference or non-conference call.

This may also include the media conductor 202 processing the message and forwarding the processed message to the media controller 204.

The MAS 106 determines the type of call being requested at step 504. This may include, for example, service logic mapping a call to a service. As particular examples, a number may map to a service (such as 47472@mas.com) or a request Uniform Resource Indicator ("URI") may map to a service (such as meetme@mas.com). The service determines what resources are needed, and the media controller 204 handles the connection layer (bearer) and resource allocation and selection.

The MAS 106 then routes the request for the requested communication session to the appropriate media processor at step 506. This may include, for example, the media controller 204 routing processed messages involving conference calls to the media processor 206b and routing processed messages involving non-conference calls to the media processor 206a. At this point, the media processor 206 that receives the request establishes and maintains a communication session involving two or more ports 214.

The MAS 106 determines whether the type of call has been changed at step 508. This may include, for example, the MAS 106 receiving a request to convert a non-conference call into a conference call, such as when a participant to the two-way call invokes a three-way calling feature. This may also include the MAS 106 detecting that all but two participants to a conference call have left the conference.

If the type of call changes, the MAS 106 transfers the call to the appropriate media processor at step 510. This may include, for example, the MAS 106 causing the communication devices 102 involved in the call to begin using different ports 214 coupled to a different media processor 206. This may also include the MAS 106 using the signaling messages shown in FIG. 3 or any other suitable messages. The MAS 106 determines whether the call is continuing at step 512. If so, the MAS 106 returns to step 508. Otherwise, the method 500 ends.

Although FIG. 5 illustrates one example of a method 500 for providing communication services in a communication system, various changes may be made to FIG. 5. For example, while the method 500 has been described as determining whether a call type has changed based on the number of participants involved in the call, other or additional factors could be used to identify the type of call.

Figure 6:
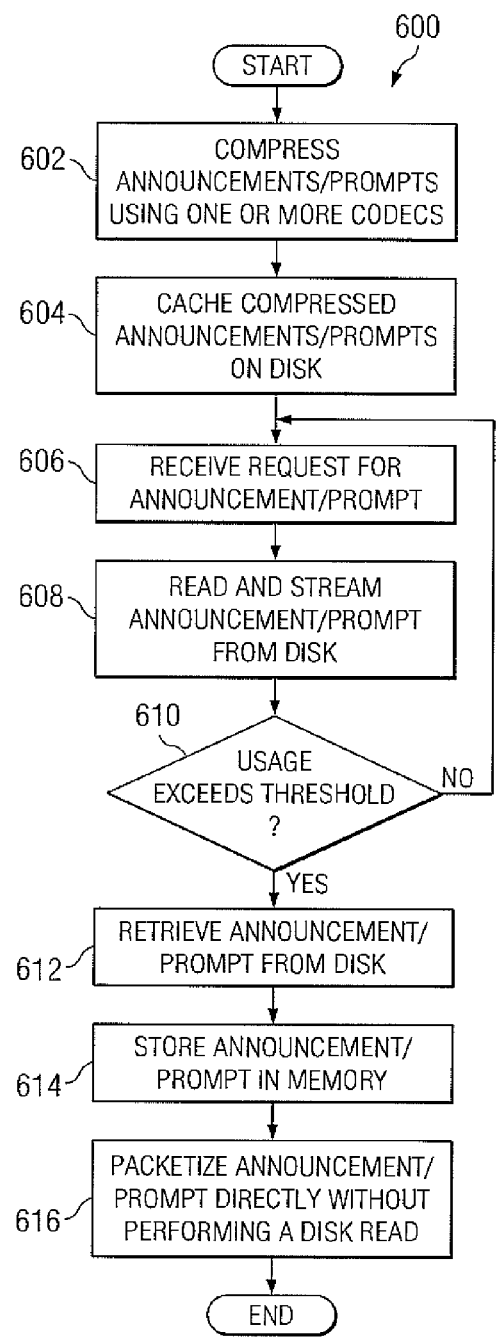
FIGS. 6-8 illustrate example methods for processing audio information of a communication session according to one embodiment of this disclosure.
Figure 7:
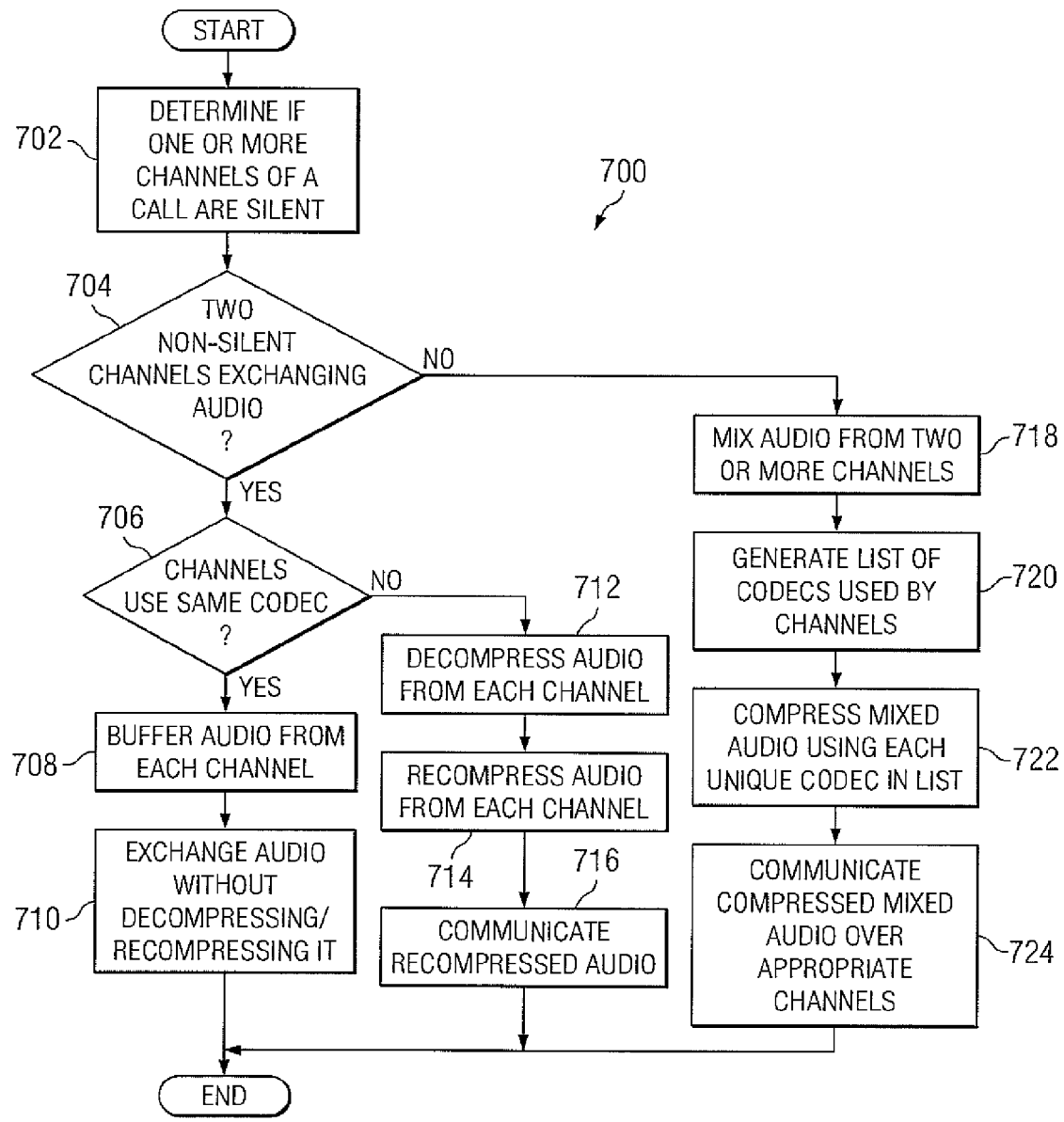
Figure 8:
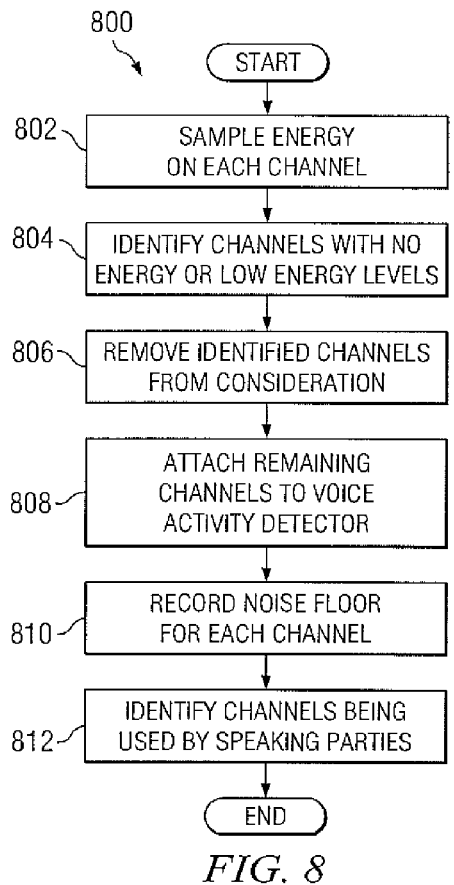

FIGS. 6-8 illustrate example methods for processing audio information of a communication session. The methods may be described with respect to the MAS 106 of FIG. 2 operating in the system 100 of FIG. 1. The methods may also be used by any other suitable devices or in any other suitable system.

In FIG. 6, a Media Application Server 106 compresses one or more announcements and prompts using one or more CODECs at step 602. The announcements and prompts represent any suitable announcements and prompts used in the system 100. For example, the announcements and prompts may include audio announcements and prompts used by the voice mail function, the auto-attendant function, or other IVR function supported by the media processor 206a. The CODEC or CODECs used can be the G.711 CODEC, the G.729 CODEC, or other or additional CODECs.

The MAS 106 caches the compressed announcements and prompts stored on disk at step 604. This may include, for example, the MAS 106 storing the compressed announcements and prompts on a hard drive, compact disk, or other disk storage.

The MAS 106 receives a request for an announcement or prompt at step 606. This may include, for example, a media processor 206 receiving or generating a request for a particular prompt needed to provide the auto-attendant function to a subscriber. The MAS 106 reads and streams the requested announcement or prompt at step 608. This may include, for example, the MAS 106 retrieving the requested announcement or prompt from the disk and streaming the announcement or prompt to a communication device 102. In some embodiments, several versions of the announcement or prompt exist on the disk, such as where the announcement or prompt has been compressed using different CODECs. The MAS 106 identifies the CODEC being used by a communication device 102 and then retrieves the announcement or prompt compressed using that CODEC. Because the announcement or prompt has already been compressed, the MAS 106 need not use processing resources to compress the announcement or prompt each time it is requested, thus gaining processing efficiency in the process.

The MAS 106 determines whether the requested announcement or prompt has been used above a threshold at step 610. This may include, for example, comparing the number of times that an announcement or prompt has been requested in a specified time period to a threshold value.

If the requested announcement or prompt has not been used above the threshold, the MAS 106 returns to step 606 to receive and process another request for an announcement or prompt.

If the requested announcement or prompt has been used above the threshold, the MAS 106 retrieves the requested announcement or prompt from static or disk memory at step 612. The MAS 106 stores the announcement or prompt in a local memory at step 614. This may include, for example, the MAS 106 storing the retrieved announcement or prompt in a local random access memory. If the announcement or prompt is again requested, the MAS 106 can packetize the announcement or prompt directly without needing to read the announcement or prompt from the disk. In this way, the MAS 106 supports two-phase caching of announcements and prompts, the first phase on static or disk memory and the second phase in faster local memory.

By compressing the announcements and prompts using one or more CODECs before the announcements and prompts are actually needed, the MAS 106 need not compress the announcements and prompts each time they are requested.

This helps to reduce the processing load placed on the MAS 106. Also, by caching the announcements and prompts in static or disk memory and then in a local memory, the MAS 106 can more quickly retrieve the announcements and prompts. This may also help to reduce the processing load placed on the MAS 106.

As shown in FIG. 7, the Media Application Server 106 also processes the audio information received during a communication session differently based on the characteristics of the communication session. For example, during a communication session, the MAS 106 determines if one or more channels of a call are silent at step 702. This may include, for example, the media processor 206 that handles the call determining whether one or more channels are silent. One example of a method for identifying silent channels is shown in FIG. 8, which is described below.

The MAS 106 also determines whether two non-silent channels are exchanging audio information at step 704. This may include, for example, the media processor. 206 determining that the communication session is a non-conference call. This may also include the media processor 206 determining whether two participants involved in a conference call are speaking.

If two non-silent channels are exchanging audio information, the MAS 106 determines whether the channels are using the same CODEC to compress the audio information at step 706. If the same CODEC is used across the channels, the MAS 106 buffers the audio information at step 708 and exchanges the audio information between the channels at step 710. In this case, the MAS 106 does not need to decompress or recompress the audio information since both channels are using the same CODEC. Otherwise, different CODECs are used by the two channels that are exchanging audio information. The MAS 106 decompresses the audio information from each channel at step 712 and recompresses the audio information from each channel using a different CODEC at step 714. The MAS 106 does this so that each channel receives audio information compressed using the proper CODEC. The MAS 106 then communicates the recompressed audio information at step 716. As shown in FIG. 7, steps 708-710 recognize processing efficiency, and as a result may require less processing power than steps 712-716 because the MAS 106 avoids decompression and recompress (or decode and code) audio information during steps 708-710. As a result, a realization in efficiency is taken as an advantage to reduce workload and CPU resources when the MAS 106 detects channels using the same CODEC.

Instead of or in addition to two non-silent channels exchanging audio information, the MAS 106 provides one or more streams of audio information from speaking participants to other participants involved in a communication session. This may occur, for example, during a conference call when the audio information from two main participants is provided to the remaining participants. If more than one participant's audio information is to be provided to other participants, the MAS 106 mixes the audio information from two or more channels at step 718. This may include, for example, the media processor 206 that handles the call mixing the audio information from multiple channels into a single sequence of packets.

The MAS 106 generates a list of CODECs used by the channels to receive the mixed audio information at step 720. This may include, for example, the media processor 206 identifying the participants to receive the mixed audio information and the CODEC used by each participant. Because multiple participants may use a common CODEC, this may also include the media processor 206 identifying each unique CODEC contained in the list of CODECs.

The MAS 106 compresses the mixed audio information using each unique CODEC contained in the list at step 722. This may include, for example, the media processor 206 compressing the mixed audio information with each unique CODEC, generating one or more versions of the mixed audio information.

The MAS 106 communicates the compressed audio information at step 724. This may include, for example, the media processor 206 communicating the same version of the compressed audio information over multiple channels, where those channels use the same CODEC. By mixing the audio information once rather than once for each channel, the load placed on the MAS 106 may be reduced. Also, by identifying and using a minimum number of unique CODECs, the MAS 106 need not repeatedly process the audio information using the same CODEC. This may also help to reduce the load placed on the MAS 106.

FIG. 8 illustrates an example method for identifying silent channels, which, in general, occurs once a communication session has been established but there is no exchange of audio information over the channel. In other words, where active conversation or data transmission is not taking place over a channel, a form of silence suppression is deployed to recoup that bandwidth otherwise allocated. The MAS 106 samples the energy of the audio information being received on each channel during a communication session at step 802. For example, each communication device 102 may communicate audio information to the MAS 106 over separate channels, and a media processor 206 samples the energy of the audio signals received. The media processor 206 could use any suitable technique known to those skilled in the art for measuring the energy level of audio signals received by the MAS 106.

The MAS 106 identifies any channels with low or no energy at step 804. For example, the media processor 206 determines whether the measured energy levels exceed a threshold value. In some embodiments, the audio information received by the MAS 106 over a channel is compressed using a CODEC. In particular embodiments, the MAS 106 determines whether the audio information received over the channel has low or no energy without decompressing the audio information. This may be achieved, for example, using the ITU-T G.729AB silence detection or the IETF RFC 3389 silence suppression.

The MAS 106 removes the identified channels having low or no energy at step 806. This may include, for example, the media processor 206 removing the channels having no or low energy levels. The media processor 206 need not use any audio information received over these channels or provide that audio information to any other participants in a communication session. In this regard, bandwidth efficiencies are realized in that data representing silent channels need to not be conveyed to parties in a non-conference or conference communication session. For example, in a conference communication session having video and audio capabilities, the audio portion of the silent channels is suppressed. Suppression of the silent channels eliminates background or white noise from the conference communication session, improving the quality of the audio portion of the session, while video information portion of the session continues transmission to those video-capable devices 102.

The MAS 106 attaches one or more voice activity detectors to the remaining channels at step 808. This may include, for example, the media processor 206 attaching a voice activity detector to each of the remaining channels.

As a particular example, the voice activity detectors may represent software processes that attempt to detect voices in incoming audio information.

The MAS 106 records or identifies a noise floor for each of the channels at step 810. The noise floor for a particular channel represents the average noise present in the incoming audio information. As a particular example, a user of a communication device 102 could be riding in a car, and the engine noise could be recorded by the video client 102 and communicated to the MAS 106. This engine noise represents noise that need not be provided to other participants in a communication session. In some embodiments, the noise floor is identified by sampling a participant's channel at different times. In particular embodiments, the participant's channel is sampled both when the participant is speaking and when the participant is not speaking so that the voice detector may determine what constitutes noise.

The MAS 106 identifies any channel being used by a speaking party at step 812. This may include, for example, the media processor 206 determining whether the energy level of a channel exceeds the noise floor for that channel. In this case, the excessive energy may represent the voice of the user who is using a communication device 102. At this point, the audio information from the speaking parties may be processed by the MAS 106 as shown in FIG. 7.

Although FIGS. 6-8 illustrate examples of methods for processing audio information in a communication system, various changes may be made to FIGS. 6-8. For example, FIG. 6 illustrates that the announcements and prompts are cached in the local memory by comparing the number of requests to a threshold. Other characteristics may be used to cache the announcements and prompts in the local memory.

As an example, the most requested announcements and prompts may be cached without reference to whether they are used above a threshold level. Also, FIG. 7 illustrates that the MAS 106 performs either steps 706-716 or steps 718-724 during a communication session. The MAS 106 may also perform both sets of steps either at the same time or at different points during the call. Further, the MAS 106 may repeatedly identify whether one or more channels are silent and need not only perform step 702 once during a call. In addition, the MAS 106 could use any other technique to identify silent participants in a communication session.

Figure 9:
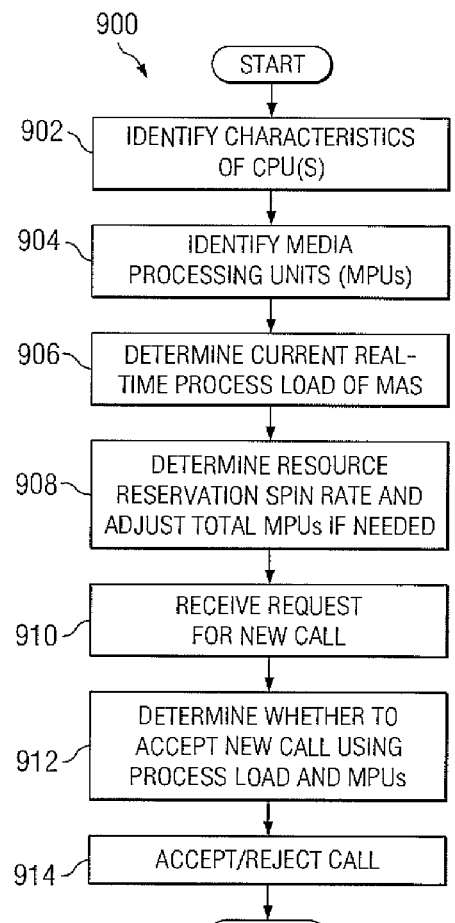
FIGS. 9-11 illustrate an example method for managing resources in a communication system according to one embodiment of this disclosure.
Figure 10:
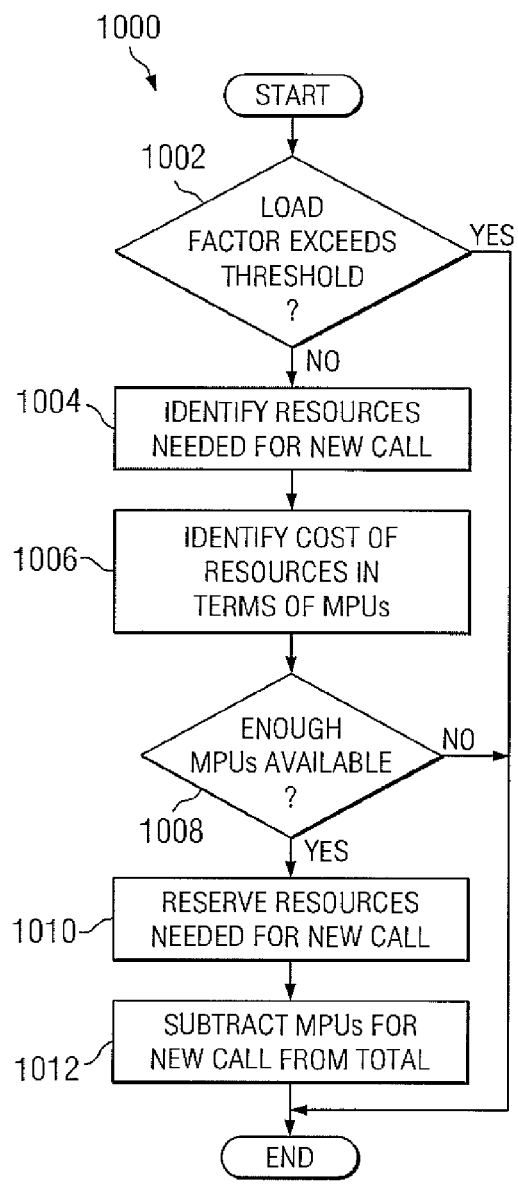
Figure 11:
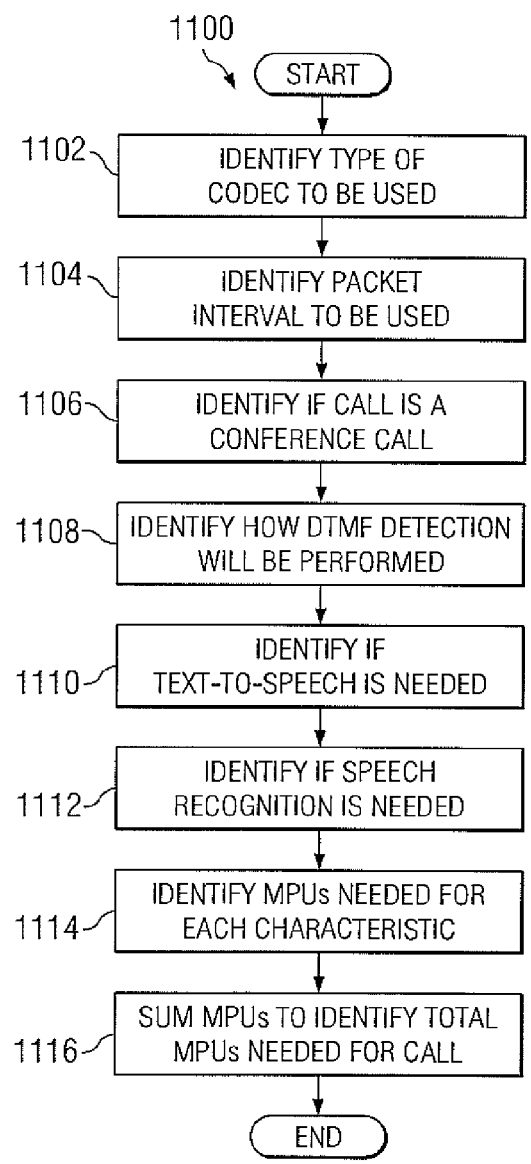

FIGS. 9-11 illustrate an example method for managing resources in a communication system according to one embodiment of this disclosure. In particular, the method shown in FIGS. 9-11 determines whether a new communication session should be established in the communication system. The method in FIGS. 9-11 is described with respect to the MAS 106 of FIG. 2 operating in the system 100 of FIG. 1. The method in FIGS. 9-11 could also be used by any other suitable device or in any other suitable system.

In FIG. 9, a MAS 106 identifies one or more characteristics of at least one central processing unit ("CPU") in the MAS 106 at step 902. This may include, for example, the MAS 106 identifying one or more characteristics of at least one CPU 110 in the MAS 106. These characteristics may include the number of CPUs, the type of CPUs (manufacturer, model, etc.), and the clock speed of the CPUs.

The MAS 106 identifies an available number of media processing units ("MPUs") associated with the CPUs at step 904. The MPUs represent a measure of the processing resources provided by the CPUs that are capable of being used by the media processors 206 or other components in the MAS 106.

In some embodiments, the number of MPUs is calculated by assigning a default number of MPUs to different types and speeds of CPUs. For example, one number of MPUs may be associated with Intel Xeon CPUs operating at one clock speed, and another number may be associated with AMD K7 CPUs operating at another clock speed. Also, if multiple CPUs are used in the MAS 106, the default number of MPUs associated with each CPU may be summed. In other embodiments, the number of MPUs is statically assigned to a MAS 106, and the MAS 106 retrieves this value without needing to identify the CPU characteristics at step 902 or identify the MPUs at step 904.

The MAS 106 determines the present communication session load placed on the MAS 106 at step 906. The load may be expressed in any suitable terms to convey relative loads of the MAS 106, such as by identifying the percentage of CPU resources currently used by the processes executed by the MAS 106. This may also include the MAS 106 ignoring any process other than the components 202-208 of the MAS 106. The other processes may represent utilities or other applications that are executed by the MAS 106 and that have or could be assigned a lower priority than the components 202-208. As a result, the processing resources used by the other processes would not matter since the components 202-208 would be given priority access to any resources used by the other processes. In some embodiments, the MAS 106 repeatedly performs this step. In a particular embodiment, the MAS 106 determines the current process load every ten seconds, and the larger of the two previous measurements is used as the current process load.

The MAS 106 determines the "spin rate" of resource allocations at step 908. The resource allocation spin rate represents how quickly the MAS 106 is processing requests, such as requests for communication sessions. If the spin rate exceeds a threshold, the MAS 106 adjusts the previously identified available MPU value. In this way, the MAS 106 detects, for example, when a rapid series of short communication sessions are being established. The resources actually used during the rapid series of communication sessions may be small, but the processing resources needed to set up and terminate the communication sessions may be large. By monitoring the spin rate, the MAS 106 is able to more accurately identify the amount of resources available for use in the system 100.

The MAS 106 receives a request to establish a communication session at step 910. This may include, for example, the MAS 106 receiving a SIP request from a communication device 102 or the SIP application server 210.

The MAS 106 determines whether the requested communication session should be established at step 912. This may include, for example, the MAS 106 using the identified available MPU value and the current process load to determine whether to establish the requested communication session. An example method for determining whether a requested communication session should be established is shown in FIG. 10, which is described below. Based on this determination, the media application MAS 106 accepts or rejects the requested communication session at step 914.

FIG. 10 illustrates a method 1000 for determining whether to accept or reject a requested communication session. A MAS 106 determines whether the present communication session load factor exceeds a threshold at step 1002. This may include, for example, the MAS 106 comparing the current process load identified at step 906 to a threshold, such as seventy or eighty-five percent. If the current load exceeds the threshold, the method 1000 ends, and the requested communication session is rejected. In this example, the current load placed on the MAS 106 is large and provides an insufficient MPU to accommodate additional communications sessions. Requests for communication sessions should be rejected until additional CPU resources, or MPUs, are available.

Otherwise, the MAS 106 identifies the MPU resources needed for the requested communication session at step 1004. This may include, for example, the MAS 106 determining whether text-to-speech or speech recognition resources are needed for the requested communication session. The MAS 106 determines the cost of the needed resources in terms of MPUs at step 1006. This may include, for example, the MAS 106 determining how many MPUs are needed to provide the text-to-speech or speech recognition resources. An example method for identifying needed resources and identifying a cost of those resources is shown in FIG. 11, which is described below.

The MAS 106 determines whether sufficient MPUs are available to handle the requested communication session at step 1008. This may include, for example, determining whether the number of MPUs needed for the requested communication session exceeds the available MPUs previously determined. If the number of MPUs needed for the requested communication session exceeds the available MPUs, the method 1000 ends, and the communication session is rejected. Otherwise, the MAS 106 reserves the resources needed for the requested communication session at step 1010. The MAS 106 also subtracts the number of MPUs needed for the requested communication session from the total available MPUs at step 1012. In this way, the MAS 106 tracks the amount of processing resources available after the requested communication session has been accepted.

FIG. 11 illustrates an example method 1100 for identifying resources needed for a requested communication session and identifying a cost of these resources. A MAS 106 determines the type of CODEC to be used during a requested communication session at step 1102. For example, the G.711 CODEC compresses audio information to a lesser extent than the G.729 CODEC. As a result, using the G.711 CODEC consumes fewer resources than a call using the G.729 CODEC. In some embodiments, the exact CODEC to be used may be unknown at this point, and the MAS 106 assumes the worst and identifies the CODEC that consumes the greatest quantity of resources.

The MAS 106 identifies the packet interval to be used during the communication session at step 1104. For example, a communication device 102 may communicate a packet of audio information to the MAS 106 every 10 ms, 20 ms, or 30 ms. Calls using a smaller packet interval involve more packets being sent to the MAS 106, so these calls are more resources intensive than calls with longer packet intervals.

The MAS 106 identifies whether a call is a conference call at step 1106. Conference calls typically require the MAS 106 to perform more functions, such as the silence detection and audio mixing functions described above with respect to FIGS. 7 and 8.

The MAS 106 determines how DTMF detection would occur during the communication session at step 1108. For example, the DTMF information may be sent to the MAS 106 in-band or using the RFC 2833 standard. The in-band technique requires more resources to extract and process the DTMF information.

The MAS 106 identifies whether a text-to-speech function is needed at step 1110 and whether speech recognition is needed at step 1112. Communication sessions requiring these functions require greater resources than calls that do not require these functions.

For each of these identified characteristics of the requested communication session, the MAS 106 determines a number of MPUs needed for each characteristic at step 1114. This may include, for example, the MAS 106 assigning zero MPUs to the DTMF detection characteristic when the RFC 2833 mechanism is used and assigning 0.5 MPUs when in-band DTMF detection is needed. Any suitable number of MPUs can be assigned to each of these characteristics. The media application MAS 106 sums these individual MPUs to identify the total number of MPUs needed for a requested communication session at step 1116. The total number of MPUs represents the estimated resources that are needed to handle the requested communication session.

Although FIGS. 9-11 illustrate an example method for managing resources in a communication system, various changes may be made to FIGS. 9-11. For example, in FIG. 9, the present communication session load may be calculated before calculating the available MPUs. Also, in FIG. 10, other techniques can be used to decide whether to accept or reject a requested communication session. In addition, in FIG. 11, any other or additional characteristics of a call may be used to identify the total resources needed during the requested communication session.

The Media Application Server 106 described above may provide various technical features or advantages over previous systems. For example, the MAS 106 may more efficiently handle different portions of a communication session by transferring the communication session between media processors 206. Also, the MAS 106 may more accurately determine whether requested communication sessions should be accepted or rejected using the present communication session load and resources of the MAS 106. Further, the MAS 106 may more efficiently process audio information from various communication devices 102, which helps to reduce the processing load placed on the MAS 106.

In addition, Media Application Servers 106 can be added more easily to a ring of servers 106 in a communication system.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for supporting a communication session between at least two communication devices, the apparatus comprising:
   a plurality of processors, each processor configured to perform a respective function in support of a communication session portion of a communication session;
   a controller configured to transfer the communication session from a first of the processors configured to perform a first function required for a first portion of the communication session to a second of the processors configured to perform a second function different from the first function required for a second portion of the communication session, the controller comprises a first controller; and
   the first controller is further configured to transmit first messages to a second controller and receive second messages from a third controller, the first and second messages associated with communication sessions handled by the controllers, the first messages comprising at least one of one or more messages generated by the first controller and one or more of the second messages.

2. The apparatus of claim 1, wherein:
   the first processor is an Interactive Voice Response (IVR) media processor configured to provide media processing required to support IVR; and
   the second processor is a conference media processor configured to provide media processing required to support a conference bridge.

3. The apparatus of claim 1, further comprising a conductor configured to receive a request associated with the communication session and to provide the request to the controller.

4. The apparatus of claim 3, wherein the conductor, controller, and processors comprise software processes executed by the apparatus.

5. The apparatus of claim 3, wherein:
   the request comprises a Session Initiation Protocol (SIP) message; and
   the conductor represents a SIP service portal.

6. The apparatus of claim 1, further comprising a plurality of ports, each of the processors associated with a unique set of one or more ports.

7. The apparatus of claim 1, wherein:
   the first controller is configured to transmit the first messages to the second controller using a primary address associated with the second controller; and
   the first controller is further configured to use a backup address when communication with the second controller fails.

8. A method for supporting a communication session between at least two communication devices, the method comprising:
   establishing a communication session using one of a plurality of processors, the communication session comprising a plurality of portions requiring distinct media processing functions, the processors configured to perform respective different sets of media processing functions in support of different portions of the communication session;
   detecting a transition from a first portion of the communication session requiring a first set of media processing functions to a second portion of the communication session requiring a second set of media processing functions different from the first set of media processing functions;
   transferring the communication session from a first processor configured to perform the first set of media processing functions to a second processor configured to perform the second set of media processing functions; and
   transmitting first messages from the first controller to a second controller and receiving second messages from a third controller, the first and second messages associated with communication sessions handled by the controllers, the first messages comprising at least one of one or more messages generated by the first controller and one or more of the second messages.

9. The method of claim 8, wherein:
   the first processor is an Interactive Voice Response (IVR) media processor configured to provide media processing required to support IVR; and
   the second processor is a conference media processor configured to provide media processing required to support a conference bridge.

10. The method of claim 9, wherein detecting the transition comprises detecting an invocation of a three-way calling feature during a non-conference communication session.

11. The method of claim 8, further comprising receiving a request associated with the communication session, the request comprising a Session Initiation Protocol (SIP) message.

12. The method of claim 8, wherein transferring the communication session comprises transferring a communication device involved in the communication session from a first port to a second port, one of the processors associated with the first port and another of the processors associated with the second port.

13. The method of claim 8, wherein:
   the first controller is configured to transmit the first messages using a primary address associated with the second controller; and
   the first controller is further configured to use a backup address when communication with the second controller fails.

14. An apparatus for supporting a communication session between at least two communication devices, the apparatus comprising:

a plurality of processors, each processor configured to perform a respective function in support of a communication session portion of a communication session; and a controller configured to transfer the communication session from a first of the processors configured to perform a first function required for a first portion of the communication session to a second of the processors configured to perform a second function different from the first function required for a second portion of the communication session, the controller further configured to transmit a message to one of the at least two communication devices identifying a port of the second of the processors that the one communication device should begin using for the second portion of the communication session.

15. A method for supporting a communication session between at least two communication devices, the method comprising:

establishing a communication session using one of a plurality of processors, the communication session comprising a plurality of portions requiring distinct media processing functions, the processors configured to perform respective different sets of media processing functions in support of different portions of the communication session;

detecting a transition from a first portion of the communication session requiring a first set of media processing functions to a second portion of the communication session requiring a second set of media processing functions different from the first set of media processing functions;

transferring the communication session from a first processor configured to perform the first set of media processing functions to a second processor configured to perform the second set of media processing functions; and transmitting a message to one of the at least two communication devices identifying a port of the second processor that the one communication device should begin using for the second portion of the communication session.

* * * * *